United States Patent [19]

Avila, Jr.

[11] Patent Number: 4,896,393

[45] Date of Patent: Jan. 30, 1990

[54] DIP-STICK WIPER WITH BUILT-IN OIL DETAINER

[76] Inventor: Hector M. Avila, Jr., 234 E. Empire St., San Jose, Calif. 95112

[21] Appl. No.: 275,950

[22] Filed: Nov. 25, 1988

[51] Int. Cl.⁴ .............................................. A47L 25/00
[52] U.S. Cl. .............................................. 15/210 B
[58] Field of Search ................... 15/210 B, 218.1, 221, 15/248 R, 184, 236.01, 236.02, 245, 256.5; 33/126.7 R

[56] References Cited

U.S. PATENT DOCUMENTS

| | | | |
|---|---|---|---|
| 2,069,406 | 2/1937 | Esch | 15/210 B |
| 2,259,898 | 10/1941 | Lescher | 15/210 B |
| 2,810,923 | 10/1957 | Desso | 15/221 |
| 3,094,730 | 6/1963 | Schwarz | 15/218.1 |
| 3,205,523 | 9/1965 | Seaver | 15/184 |
| 3,360,819 | 1/1968 | Bruns | 15/210 B |
| 4,017,935 | 4/1977 | Hernandez | 33/126.7 R |
| 4,207,645 | 6/1980 | Svckling | 15/210 B |
| 4,380,841 | 4/1983 | Thomas | 15/210 B |

FOREIGN PATENT DOCUMENTS

| | | | |
|---|---|---|---|
| 1079825 | 12/1954 | France | 15/210 B |
| 1288173 | 2/1962 | France | 15/210 B |
| 427417 | 4/1935 | United Kingdom | 15/210 B |
| 1161317 | 8/1969 | United Kingdom | 15/210 B |

Primary Examiner—Philip R. Coe
Assistant Examiner—Joseph S. Machuga
Attorney, Agent, or Firm—Milton S. Gerstein

[57] ABSTRACT

A wiper for wiping off an oil-dip stick of a vehicle. The wiper includes a pair of rubber wiping blades defining a pair of abutting wiping edge-surfaces between which the dip stick is inserted and thereafter pulled for wiping the use oil from all of the surfaces of the dip stick. A pair of vertical detaining channels are provided for catching and holding the wiped-off oil after the wiper has been tilted. A lower horizontal catch-channel is also provided. The wiper is stored in a storage container after each use, whereby the wiped-off oil drains into the interior of the storage chamber for subsequent disposal at periodic intervals by water-flushing.

18 Claims, 2 Drawing Sheets

DIP-STICK WIPER WITH BUILT-IN OIL DETAINER

BACKGROUND OF THE INVENTION

The present invention is directed to a product for use in wiping oil dip-sticks of vehicles when checking the oil level. It is well-known that such a task can be unpleasant due to the splashing or splattering oil, as well as tedious, since such requires a rag or material by which to wipe the dip-stick, which is not usually readily and conveniently available.

SUMMARY OF THE INVENTION

It is the primary objective of the present invention to provide an oil dip-stick wiper that is especially designed for wiping an oil dip-stick, and which is stored within the engine compartment of a vehicle for ready and easy access when needed.

It is another objective of the present invention to provide such an oil dip-stick wiper which prevents the spillage and splattering of the wiped oil during and after the wiping process.

It is yet another objective of the present invention to provide such an oil dip-stick wiper that obviates the need of disposing of the used and wiped oil after each wiping, but instead allows for periodic emptying of stored wiped oil from a storage container associated with the wiper of the invention.

It is yet another objective of the invention to provide such an oil dip-stick wiper that is used in a facile and safe manner, requiring relatively little effort.

Toward these and other ends, the wiper of the invention includes a main wiping section comprised of two mutually-juxtapositioned rubber blades lying substantially in the same vertical plane, defining a pair of vertical edge surfaces used for wiping the used oil from a dip stick when the dip stick is inserted between the two wiping, vertical edge surfaces and pulled therealong. Operatively associated with the pair of rubber blades are a pair of oppositely-positioned vertical channels or canals used for catching the wiped used oil from the dip-stick, the canals being used to hold the used oil until the main wiping section is re-inserted into the main storage container housing the main wiping section during non-use thereof. Each canal is associated with one of the rubber blades and located opposite the exterior edge surface thereof, which edge surface thereof defines the line of connection to the frame of the main wiping section and which defines a pivot line about which the respective rubber blade is relatively movable. The two wiping edge-surfaces of the rubber blades define an open circle through which the shaft of the round dip-stick is inserted in order to position the dip-stick between the pair of wiping edge surfaces, after which insertion the shaft of the dip-stick is pulled outwardly thereof during the wiping process. For conventional flat dip-sticks, the dip-stick is slid downwardly from the top between the two wiping edge-surfaces. The main wiping section is provided with beads on portions of its outer surface which cooperate with slots formed in the main storage container for releasably holding, via a snap-fit, the main wiping section in the main storage container during non-use and for easy removal therefrom when such is needed for wiping a dip-stick.

BRIEF DESCRIPTION OF THE DRAWING

The invention will be more readily understood with reference to the accompanying drawing, wherein.

DETAILED DESCRIPTION OF THE INVENTION

Figure 1:
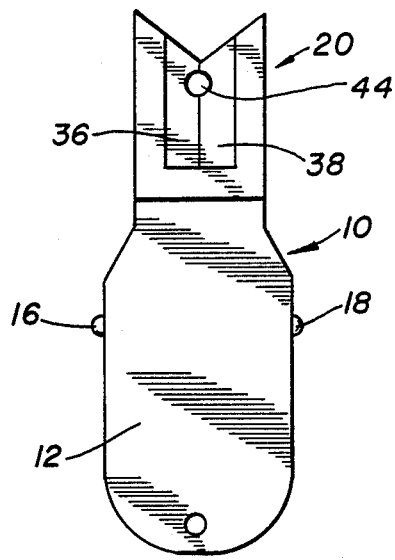
FIG. 1 is a front elevational view of the dip-stick wiper section of the invention.
Figure 2:
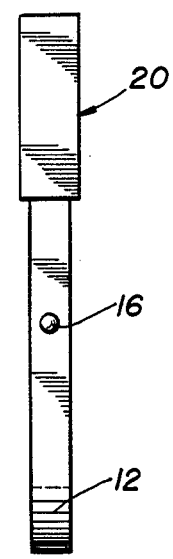
FIG. 2 is a side-elevational view thereof.
Figure 3:
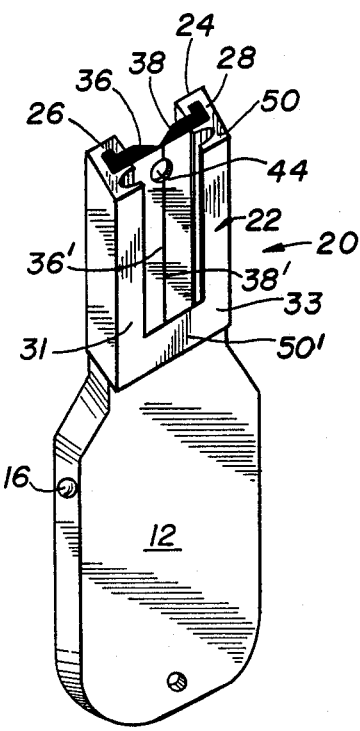
FIG. 3 is an isometric view thereof showing the pair of wiping blades and associated oil-trapping grooves thereof.

Referring now to the drawings in greater detail, the oil dip-stick wiper section of the invention is indicated generally by reference numeral 10. The wiper section 10 is comprised of a main body portion 14 of solid plastic material, which main body portion allows for the gripping of the wiper section by a hand, and also serves the function of insertion into the main storage case or container 60 shown in FIGS. 6-8. The main body portion is provided with a pair of oppositely-disposed beads or protuberances 16, 18 which are received in a pair of elongated openings or slots 62, 64 formed in the upper portions of the side wall-surfaces 61, 63 of the main storage container 60, when the wiper section 10 is stored in the container 60 during nonuse. The beads 16, 18 are inserted into the respective slots 62, 64 when the wiper section is inserted into the main storage container 60, such being accomplished by the fact that the storage container is made of flexible plastic, thus allowing for the outward flexing thereof as the wiper section is inserted therein, until the beads 16, 18 pop into the elongated slots 62, 64, to thereby firmly hold the wiper section in place. During removal of the wiper section, the storage container again flexes outwardly to allow for relatively easy removal. The storage container 60 is mounted to a portion of the engine compartment of a vehicle, as by adhesive backing or the like, or to the inside fender wall, whereby ready and easy access to the wiper section 10 is had when it is desired to check the oil level. The storage container 60 is also provided with a series of holes or openings 70 on the lower portions of the side wall-surfaces 61, 63, front wall surface 72, and rear wall-surface 74, by which the interior of the storage container may be periodically rinsed by a water hose, or the like, so that the accumulated used and wiped-off oil may be removed from its interior.

Figure 4:
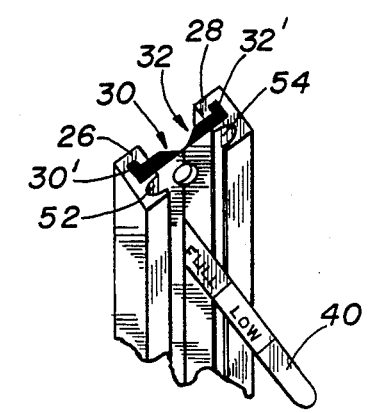
FIG. 4 is a partial isometric view similar to FIG. 3, showing a shaft of an oil dip-stick operatively engaged by the wiping edge-surfaces of the pair of rubber blades of the main wiper section of FIG. 1, at the outset of such procedure.
Figure 5:
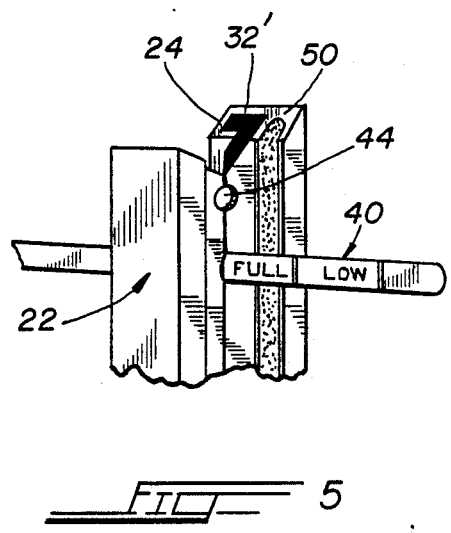
FIG. 5 is an isometric view similar to FIG. 4 showing the oil-wiping procedure at termination, with the used and wiped oil contained within one of the oil-catching grooves.

The wiper section 10, in addition to its main body portion 12, includes the oil-wiping section proper 20, best seen in FIGS. 1, and 3-5. The wiping section proper 20 is made up of a generally U-shaped double-channel frame 22. The first portion thereof 24 defines a pair of oppositely-disposed L-shaped channels 26, 28 into each of which is fixedly secured an L-shaped base section 30', 32' of a rubber wiping blade 30, 32, respectively, each wiping blade extending substantially the full length of the wiper section proper. Each L-shaped base section 30', 32' defines a fulcrum about which the respective rubber blade 30, 32 pivots during the wiping process, as explained below, while also providing the necessary structural integrity to withstand the bending and torsional forces created during the wiping process. Each blade 30, 32 has an end-tapering section 36, 38, each of which ends in a thin blade-surface 36', 38' against which an oil-dip stick 40 contacts during the wiping process, as shown in FIGS. 4 and 5. The rubber blades 30, 32 abut against each other along the respective elongated blade-surfaces 36', 38', to define therebetween an interior area which simultaneously wipes both flat surfaces of the oil-dip stick 40. The oil-dip stick 40 may be inserted or pushed through the contacting blade-surfaces 36', 38' along any portions along the lengths thereof. However, it is preferable that the oil dip stick first be placed above the wiper-section proper, and then moved downwardly to enter in between the two blade-surfaces 36', 38' beginning at the very upper surfaces thereof, the portion of the oil-dip stick thus entering the region between the two blades being that which is spaced from the lower portion of the oil-dip stick upon which is contained the oil indicating the level, as shown in FIG. 5, so that such lower oil-containing portion of the oil-dip stick is positioned away from the wiping blade-surfaces for subsequent wiping thereof when the oil-dip stick is pulled out from between the blade-surfaces, whereby the lower oil-containing portion of the oil-dip stick is thus wiped clean by the blade-surfaces. Each upper edge surface of the rubber blades, therefore, preferably slopes downwardly to aid in the insertion of the dip-stick and to provide extra stiffness thereby. Each of the blade-surfaces 36', 38' is provided with a semicircular cutout so that a circular cutout 44 is formed. This circular cutout 44 is expressly provided in order to accomodate circular-cross-sectioned oil-dip sticks used in a few automobile models. For such a circular dip-stick, the dip-stick is inserted between the two blade-surfaces starting at the uppermost portion thereof, as for the flat oil-dip sticks, and then moved downwardly until such circular oil-dip stick is received in the circular cutout 44, after which the stick is pulled out, thereby wiping the entire circumferential surface of the oil-dip stick at the same time, thus obviating the need of multiple pull-throughts of the stick or the rotation of the stick during the wiping process. It is preferable that the diameter of the cutout 44 be slightly less than the diameter of the circular oil-dip stick, to ensure adequate and thorough wiping of the used oil from the oil-dip stick. In order to expedite insertion of the circular stick in the cutout 44, the cutout 44 is positioned adjacent the upper edges of the blade-surfaces 36', 38', whereby the cutout 44 is reached only after a short distance of movement down between the two blade-surfaces.

Figure 6:
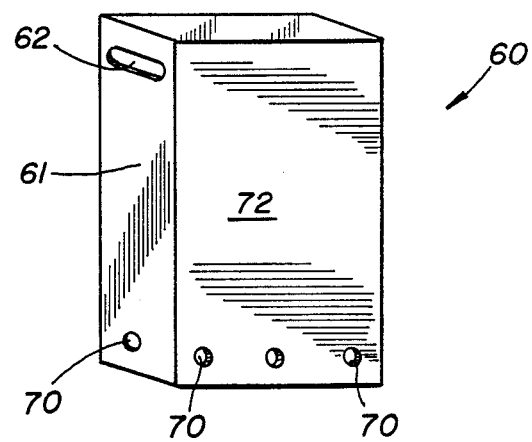
FIG. 6 is an isometric view of the main storage container housing the main wiper section of FIG. 1 during non-use, which main storage container accumulates the used and wiped oil therein from the oil contained in the oil-catching grooves of the main wiper section.
Figure 7:
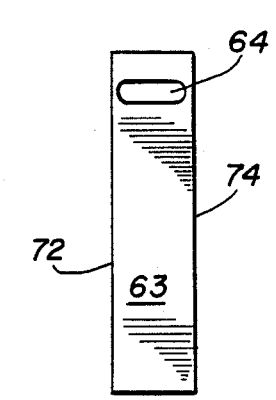
FIG. 7 is a side elevational view thereof.
Figure 8:
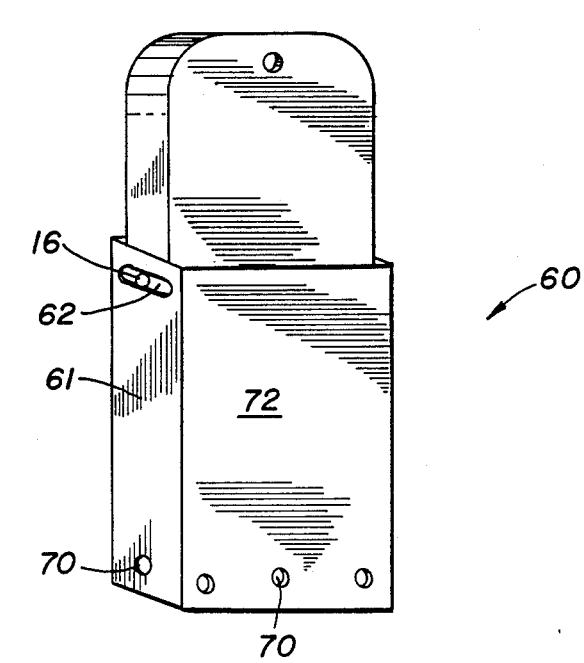
FIG. 8 is an isometric view showing the main wiper section stored in the main storage container in inverted during non-use.

The second section 50 of the U-shaped double-channel frame defines a pair of oppositely-disposed elongated, substantially V-shaped channels or grooves 52, 54, which channels 52, 54 correspond, respectively, to the channels 26, 28 of the first section of the frame. The V-shaped channels 52, 54 extend vertically, when viewing FIGS. 1-5, the entire length, or height, of the rubber blades 30, 32. Cooperating with the vertical V-shaped channels 52, 54 is a lower horizontal channel or chamber defined by the volume between the inner surfaces of the rubber blades and the shortened upstanding vertical wall portion 50' of the U-shaped channel frame proper, the shortened wall portion 50', along with the side walls 31, 33 of the frame defining an open-ended rectangular cutout which allows the dip-stick to pass therethrough during the wiping process. It is noted that the front of the frame is similarly structured to allow for the insertion and passage of the dip-stick. It is, of course, possible to form such lower horizontal channel in other ways, such as partial extension into the upper part of the main body portion 12, or the like, with or without the shortened vertical wall 50'. The V-shaped vertical channels 52, 54 are used to catch the wiped-off oil from the oil-dip stick as the stick is pulled through the junction of the two rubber blades 30, 32, which catching, or detaining, of the wiped-off oil is accomplished by slightly tilting the wiper-section 10 to one lateral side or the other, so that the wiped-off oil will aggregate along one of the V-shaped channels 52, 54, depending upon which way the device was tilted. As the V-shaped groove or channel catches or detains the wiped-off oil, such wiped-off oil flows downwardly into the lower horizontal channel, and is detained or stored there until the wiper-section 10 is returned to the main storage container 60, where the wiper-section 20 is inserted first therein as shown in FIG. 8, by which the detained or stored oil in the lower horizontal channel and in the V-shaped channels 52, 54 flows or drains downwardly into the storage container 60 for storage therein, until the storage container 60 is washed clean, as described above. It is noted that since the wiping blades are made of rubber, which offer a relatively high surface friction, the wiped-off oil does not tend to splash or splatter, and tends to drain until reaching a V-shaped channel 52, 54. The rubber blades may, in fact, be properly treated to further increase the adhesion of the oil to the surfaces thereof, so as to more greatly reduce splashing and splattering, and so that the wiped-off oil may be more easily and readily directed to a V-shaped channel 52, 54. It is noted that one may wipe off the oil adjacent the lower sections of the rubber blade-surfaces, whereby the distance to the lower horizontal channel or chamber is diminished, thereby requiring only a very small tilt, if any, to the product 10. However, it is preferable that the product be tilted, so that the V-shaped grooves 52, 54 are employed, since the most effective wiping of the oil-dip stick is achieved by not only pulling the stick through the blade-surfaces, but also vertically moving the stick while pulling it through, so that fresh, unused blade-surface areas are used during the wiping process. Of course, the product of the invention also allows for multiple wipes of the same stick before insertion back into the storage container 60, as shown in FIG. 6. After the a first wiping of the stick, the wiped-off oil will be detained in the lower horizontal channel and one of the V-shaped channels, such as channel 54, after which the product is tilted the opposite way and the stick wiped, with the wiped-off oil being detained in the channel 52 this time, it being done after ample time has elapsed to allow for the detained oil in the channel 54 to drain down to the lower horizontal detention-channel or chamber.

While a specific embodiment of the invention has been shown and described, it is to be understood that numerous changes and modifications may be made therein without departing from the scope, spirit and intent of the invention as set forth in the appended claims. The nature of the present invention also allows for the wiping of curved dip-sticks.

What I claim is:

1. A oil-dip stick wiper for use in wiping used oil from a dip stick, comprising:

a main body portion which a hand may grip;

a dip-stick wiper-section extending from said main body portion, said wiper-section comprising a frame, a pair of oppositely-disposed wiper-blades mounted on said frame, each of said pair of wiper-blades having an elongated wiping blade edge-surface, said wiping blade edge-surfaces lying parallel and in at least close proximity to each other, whereby an oil-dip stick inserted therebetween, may be pulled therebetween to thereby wipe off the oil adhered to a lower section thereof;

said frame comprising at least one elongated channel juxtapositioned adjacently to at least one of said pair of wiper-blades, whereby said at least one channel catches the wiped-off oil from said blade edge-surfaces to detain the wiped-off oil therein until subsequent draining thereof;

said at least one channel being a horizontal channel extending substantially along the width of both of said pair of wiper-blades, each said wiper-blade defining a lowermost section, said horizontal channel being juxtapositioned opposite said lowermost section of each said wiper-blade.

2. The wiper according to claim 1, wherein each of said wiper-blades is made of rubber-like material having high surface friction, so that the wiped-off oil tends to adhere to said wiper-blades.

3. The wiper according to claim 1, further comprising a storage container in which said wiper-section may be stored during nonuse thereof, said storage container defining a hollow interior volume in which said wiper-section in positioned during nonuse.

4. The wiper according to claim 3, wherein said main body portion comprises means for releasable securing said main body portion and, therefore, said wiper-section to said storage container, said storage container comprising means cooperating with said means for securing to achieve the releasable securing thereof.

5. The wiper according to claim 3, wherein said storage container comprises a series of holes formed in the lower surface wall portions thereof by which said storage container may be flushed and drained of accumulated wiped-off oil.

6. The wiper according to claim 1, wherein said frame further comprises a vertical channel extending parallel to and spaced from the length of said at least one wiper-blade; each said wiper-blade comprising an outer, elongated mounting surface secured to a portion of said frame, with the remainder of said wiper-blade projecting therefrom toward the other said wiper-blade; said vertical channel being positioned adjacent one said outer, elongated mounting surface; said vertical channel having a lower portion thereof in communication with said horizontal channel, whereby wiped-off oil in said vertical channel can flow downwardly into said horizontal channel.

7. The wiper according to claim 6, wherein said frame further comprises another vertical channel parallel to and spaced from the other said outer, elongated mounting surface of the other said wiper-blade, said another vertical channel also having a lower portion in communication with said horizontal channel.

8. The wiper according to claim 7, wherein said frame comprises a shortened, upstanding lower vertical wall section, said frame comprising a rearward cutout portion that allows for an oil-dip stick therethrough during the wiping process; said horizontal channel being at least partially defined between said lower wall section and said pair of wiper-blades.

9. The wiper according to claim 1, wherein said pair of wiping blade edge-surfaces abut against each other along the vertical length thereof.

10. The wiper according to claim 1, wherein each of said wiping blade edge-surfaces comprises a semicircular cutout juxtapositioned opposite the semicircular cutout of the other said wiping blade-surface so that a circular cutout is formed by said pair of wiping blade edge-surfaces, whereby a circular cross-sectioned dip-stick may be inserted therein and wiped.

11. The wiper according to claim 1, wherein said frame comprises a front, open-ended cutout portion for allowing a dip-stick to be inserted therethrough and between said pair of wiping blade-surfaces.

12. The wiper according to claim 11, wherein said frame comprises a pair of L-shaped channels, each said wiper-blade comprising an exterior, elongated, vertical L-shaped mounting surface received in a respective one of said pair of L-shaped channels, each said mounting surface serving as a fulcrum about which the remainder of the respective said wiper-blade may pivot.

13. The wiper according to claim 1, wherein each of said wiper-blades comprises an upper, downwardly-sloping edge surface to allow for ease of insertion of a dip-stick between said blade edge-surfaces and for stiffness.

14. A oil-dip stick wiper for use in wiping used oil from a dip stick, comprising:

a main body portion which a hand may grip;

a dip-stick wiper-section extending from said main body portion, said wiper-section comprising a frame, a pair of oppositely-disposed wiper-blades mounted on said frame, each of said pair of wiper-blades having an elongated wiping blade edge-surface, said wiping blade edge-surfaces lying parallel and in at least close proximity to each other, whereby an oil-dip stick inserted therebetween, may be pulled therebetween to thereby wipe off the oil adhered to a lower section thereof;

said frame comprising a front, open-ended cutout portion for allowing a dip-stick to be inserted therethrough and between said pair of wiping blade-surfaces;

said frame comprising a pair of L-shaped channels, each said wiper-blade comprising an exterior, elongated, vertical L-shaped mounting surface received in a respective one of said pair of L-shaped channels, each said mounting surface serving as a fulcrum about which the remainder of the respective said wiper-blade may pivot.

15. A oil-dip stick wiper for use in wiping used oil from a dip stick, comprising:

a main body portion which a hand may grip;

a dip-stick wiper-section extending from said main body portion, said wiper-section comprising a frame, a pair of oppositely-disposed wiper-blades mounted on said frame, each of said pair of wiper-blades having an elongated wiping blade edge-surface, said wiping blade edge-surfaces lying parallel and in at least close proximity to each other, whereby an oil-dip stick inserted therebetween, may be pulled therebetween to thereby wipe off the oil adhered to a lower section thereof;

a storage container in which said wiper-section may be stored during nonuse thereof, said storage container defining a hollow interior volume in which said wiper-section in positioned during nonuse;

said storage container comprising a series of holes formed in the lower surface wall portions thereof by which said storage container may be flushed and drained of accumulated wiped-off oil.

16. The wiper according to claim 15, wherein said frame comprises at least one elongated channel juxtapositioned adjacently to at least one of said pair of wiper-blades, whereby said at least one channel catches the wiped-off oil from said blade edge-surfaces to detain the wiped-off oil therein until subsequent draining thereof.

17. The wiper according to claim 16, wherein said at least one channel is a vertical channel extending parallel to and spaced from the length of said at least one wiper-blade.

18. The wiper according to claim 16, wherein said at least one channel is a horizontal channel extending along the entire width of both of said pair of wiper-blades, each said wiper-blade defining a lowermost section, said horizontal channel being juxtapositioned opposite said lowermost section of each said wiper-blade.

* * * * *